United States Patent
Ahn et al.

(10) Patent No.: US 11,110,968 B2
(45) Date of Patent: Sep. 7, 2021

(54) FLOOR STRUCTURE FOR VEHICLE

(71) Applicants: HYUNDAI MOTOR COMPANY, Seoul (KR); KIA MOTORS CORPORATION, Seoul (KR)

(72) Inventors: Hyun Ahn, Seoul (KR); Jae Ha Shim, Seoul (KR); Hee Suk Chung, Hwaseong-si (KR); Young Ho Lee, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 189 days.

(21) Appl. No.: 16/661,664

(22) Filed: Oct. 23, 2019

(65) Prior Publication Data
US 2020/0231222 A1 Jul. 23, 2020

(30) Foreign Application Priority Data
Jan. 22, 2019 (KR) .......................... 10-2019-0008226

(51) Int. Cl.
| | | |
|---|---|---|
| *B60J 7/00* | (2006.01) | |
| *B62D 25/20* | (2006.01) | |
| *B60K 1/04* | (2019.01) | |
| *B60N 2/01* | (2006.01) | |
| *B62D 21/02* | (2006.01) | |

(52) U.S. Cl.
CPC ............ *B62D 25/2036* (2013.01); *B60K 1/04* (2013.01); *B60N 2/012* (2013.01); *B62D 21/02* (2013.01); *B60K 2001/0438* (2013.01)

(58) Field of Classification Search
CPC ..... Y02E 60/10; H01M 50/20; H01M 50/502; Y02T 10/70; B25F 5/02; C08F 210/00; C08F 210/06; C08F 210/16; C08L 67/02; A23V 2002/00
See application file for complete search history.

(56) References Cited

U.S. PATENT DOCUMENTS

| | | | |
|---|---|---|---|
| 8,925,991 B2* | 1/2015 | Caliskan ............. | B62D 27/065 |
| | | | 296/29 |
| 8,936,125 B2* | 1/2015 | Nakamori ............... | B60K 1/04 |
| | | | 180/68.5 |
| 9,033,085 B1 | 5/2015 | Rawlinson | |

(Continued)

FOREIGN PATENT DOCUMENTS

JP    2012-183858 A    9/2012

OTHER PUBLICATIONS

Office Action issued in corresponding U.S. Appl. No. 16/655,896 dated Feb. 4, 2021.

*Primary Examiner* — Kiran B Patel
(74) *Attorney, Agent, or Firm* — Morgan, Lewis & Bockius LLP

(57) ABSTRACT

A floor structure for a vehicle includes: a center floor panel; a plurality of seat crossmembers extending in a width direction of a vehicle; a rail member disposed to be orthogonal to the plurality of seat crossmembers; a pair of side sills disposed on both sides of the center floor panel; and a pair of battery mounting beams coupled to the pair of side sills, respectively, wherein each battery mounting beam is coupled to an inboard sidewall of each side sill, and cylindrical nuts for mounting a battery assembly are individually disposed on the battery mounting beams and the seat crossmembers.

10 Claims, 6 Drawing Sheets

(56) References Cited

U.S. PATENT DOCUMENTS

| | | | | |
|---|---|---|---|---|
| 10,112,470 B2* | 10/2018 | Hamilton | | B62D 27/065 |
| 10,494,026 B2* | 12/2019 | Takahashi | | B62D 25/025 |
| 10,913,340 B2* | 2/2021 | Tsuyuzaki | | B62D 25/025 |
| 2002/0145307 A1 | 10/2002 | Fujita | | |
| 2012/0043147 A1 | 2/2012 | Milner et al. | | |
| 2012/0097466 A1* | 4/2012 | Usami | | B60K 1/04 |
| | | | | 180/68.5 |
| 2012/0161472 A1* | 6/2012 | Rawlinson | | B60R 16/04 |
| | | | | 296/187.08 |
| 2013/0075173 A1* | 3/2013 | Kato | | H01M 50/20 |
| | | | | 180/68.5 |
| 2013/0175829 A1 | 7/2013 | Kim et al. | | |
| 2013/0229030 A1* | 9/2013 | Yamaguchi | | B60L 50/66 |
| | | | | 296/193.07 |
| 2014/0284125 A1* | 9/2014 | Katayama | | B60L 50/64 |
| | | | | 180/68.5 |
| 2014/0291046 A1* | 10/2014 | Araki | | B62D 25/2036 |
| | | | | 180/68.5 |
| 2014/0338997 A1* | 11/2014 | Okada | | B62D 25/00 |
| | | | | 180/68.5 |
| 2014/0338998 A1* | 11/2014 | Fujii | | H01M 10/625 |
| | | | | 180/68.5 |
| 2016/0006008 A1* | 1/2016 | Volz | | B60K 1/04 |
| | | | | 429/61 |
| 2017/0217296 A1 | 8/2017 | Nomura et al. | | |
| 2017/0267057 A1 | 9/2017 | Koyama et al. | | |
| 2017/0305248 A1* | 10/2017 | Hara | | B60K 1/04 |
| 2017/0305249 A1* | 10/2017 | Hara | | H01M 50/20 |
| 2017/0305250 A1* | 10/2017 | Hara | | B60K 1/04 |
| 2017/0313170 A1* | 11/2017 | Hara | | B60K 1/04 |
| 2018/0056768 A1 | 3/2018 | Fujiwara et al. | | |
| 2018/0086192 A1* | 3/2018 | Ishihara | | B60R 16/0207 |
| 2018/0134320 A1* | 5/2018 | Jeong | | B62D 25/025 |
| 2018/0134324 A1* | 5/2018 | Son | | B60K 1/04 |
| 2018/0236863 A1* | 8/2018 | Kawabe | | B62D 25/025 |
| 2018/0237075 A1* | 8/2018 | Kawabe | | B60K 1/04 |
| 2019/0359260 A1* | 11/2019 | Tsuyuzaki | | B60R 16/04 |
| 2019/0359265 A1* | 11/2019 | Tsuyuzaki | | B60K 1/04 |
| 2020/0086928 A1* | 3/2020 | Morimoto | | B62D 25/08 |
| 2020/0114972 A1* | 4/2020 | Lee | | B62D 25/025 |
| 2020/0140018 A1* | 5/2020 | Grottke | | B60K 1/04 |
| 2020/0269933 A1* | 8/2020 | Ryu | | B62D 25/025 |
| 2020/0324637 A1 | 10/2020 | Hammond, Jr. et al. | | |
| 2020/0324827 A1* | 10/2020 | Ahn | | B62D 25/20 |
| 2020/0381686 A1* | 12/2020 | Yamada | | B60L 50/64 |
| 2020/0406982 A1* | 12/2020 | Chung | | B62D 27/023 |
| 2021/0070376 A1* | 3/2021 | Takahashi | | B60K 1/04 |
| 2021/0078638 A1* | 3/2021 | Hirota | | B62D 21/157 |
| 2021/0094624 A1* | 4/2021 | Takahashi | | B60L 50/66 |
| 2021/0094626 A1* | 4/2021 | Kimura | | B62D 25/2036 |
| 2021/0101464 A1* | 4/2021 | Matsushima | | B60K 1/04 |
| 2021/0104717 A1* | 4/2021 | Matsushima | | H01M 50/20 |
| 2021/0107571 A1* | 4/2021 | Fujisawa | | B60K 1/04 |
| 2021/0146763 A1* | 5/2021 | Shin | | B60L 50/66 |
| 2021/0164511 A1* | 6/2021 | Jeong | | F16B 33/004 |

\* cited by examiner

FLOOR STRUCTURE FOR VEHICLE

CROSS-REFERENCE TO RELATED APPLICATION

This application is based on and claims the benefit of priority to Korean Patent Application No. 10-2019-0008226, filed on Jan. 22, 2019, in the Korean Intellectual Property Office, the disclosure of which is incorporated herein in its entirety by reference.

TECHNICAL FIELD

The present disclosure relates to a floor structure for a vehicle, and more particularly, to a floor structure for a vehicle which allows a battery assembly to be firmly mounted under a floor of a vehicle, and prevents interference with a hanger attachment or the like for loading a vehicle body during the assembly of the vehicle body.

BACKGROUND

Recently, as the perception of environmental crisis and depletion of oil resources has increased, research and development of eco-friendly electric vehicles have actively been conducted. Electric vehicles include a plug-in hybrid electric vehicle (PHEV), a battery electric vehicle (BEV), a fuel cell electric vehicle (FCEV), etc.

An electric vehicle may be equipped with a high-voltage battery assembly which is mounted to a vehicle body. The high-voltage battery assembly may include one or more battery cells (or a battery module), electrical components associated with the battery cells, and a battery case in which the battery cells and the electrical components are mounted. The battery case may consist of an upper case and a lower case. The high-voltage battery assembly may be mounted under a floor panel of the vehicle body.

In order to easily mount the battery assembly, a battery-integrated center floor panel in which the upper case of the high-voltage battery assembly is combined with a center floor panel has recently been applied. A pair of side sills may be mounted on both sides of the center floor panel. Each side sill may include an inner side sill and an outer side sill, and a side reinforcing member formed of an aluminum extruded product may be mounted in each inner side sill. The high-voltage battery assembly may have a pair of side mountings provided on both sides of the lower case. The side mountings may be coupled to the side reinforcing members of the side sills through bolts, cylindrical nuts (pipe nuts), and/or the like, respectively, so that the high-voltage battery assembly may be mounted to the side sills.

In a vehicle floor structure according to the related art, as the side mounting of the high-voltage battery assembly extends to the side sill, a space between the side mounting and an outboard sidewall of the side sill may be relatively narrowed. During the assembly of the vehicle body, a bogie or a hanger attachment for loading the vehicle body may interfere with the side mounting, and the mounting of the high-voltage battery assembly should only be performed in the final step of the vehicle body assembly process, which makes the mounting of the high-voltage battery assembly very cumbersome.

Moreover, as the space between the side mounting and the outboard sidewall of the side sill is relatively narrow, it would be difficult to secure enough space for impact absorption in a side collision, causing deformation of the high-voltage battery assembly in the side collision.

Furthermore, in the vehicle floor structure according to the related art, the high-voltage battery assembly may be mounted to the center floor panel through a plurality of fastening points (for example, four fastening points), and stiffness of the center floor panel may be reduced. In order to prevent the lack of stiffness, a reinforcing plate may be provided on each fastening point of the center floor panel, resulting in an increase in weight and manufacturing cost.

In addition, in the vehicle floor structure according to the related art, when the side reinforcing member is assembled into the inner side sill, interference with the inner side sill may occur, causing a difficulty in loading the side reinforcing member.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides a floor structure for a vehicle which allows a battery assembly to be firmly mounted under a floor of a vehicle, and prevents interference with a hanger attachment or the like for loading a vehicle body during the assembly of the vehicle body.

According to an aspect of the present disclosure, a floor structure for a vehicle may include: a center floor panel; a plurality of seat crossmembers extending in a width direction of a vehicle; a rail member disposed to be orthogonal to the plurality of seat crossmembers; a pair of side sills disposed on both sides of the center floor panel; and a pair of battery mounting beams coupled to the pair of side sills, respectively, wherein each battery mounting beam may be coupled to an inboard sidewall of each side sill, and cylindrical nuts for mounting a battery assembly may be individually disposed on the battery mounting beams and the seat crossmembers.

The battery mounting beam may have a plurality of first through holes, a first cylindrical nut for mounting the battery assembly may be coupled to each first through hole, and the first cylindrical nut may have a first female thread to which a first bolt is screwed.

The first through hole may include a first upper opening in a top surface of the battery mounting beam, and a first lower opening in a bottom surface of the battery mounting beam.

The first cylindrical nut may include a first cylindrical portion passing through the first through hole, and a first head portion provided on a bottom end of the first cylindrical portion.

A top end of the first cylindrical portion may be coupled to the first upper opening, and the bottom end of the first cylindrical portion may be coupled to the first lower opening.

Each seat crossmember may have a plurality of second through holes, a second cylindrical nut for mounting the battery assembly may be coupled to each second through hole, and the second cylindrical nut may have a second female thread to which a second bolt is screwed.

The second through hole may include a second upper opening in a top surface of the seat crossmember, and a second lower opening in a bottom surface of the seat crossmember.

The second cylindrical nut may include a second cylindrical portion passing through the second through hole, and a second head portion provided on a bottom end of the second cylindrical portion.

A top end of the second cylindrical portion may be coupled to the second upper opening, and the bottom end of the second cylindrical portion may be coupled to the second lower opening.

The center floor panel may have an opening in the center thereof.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
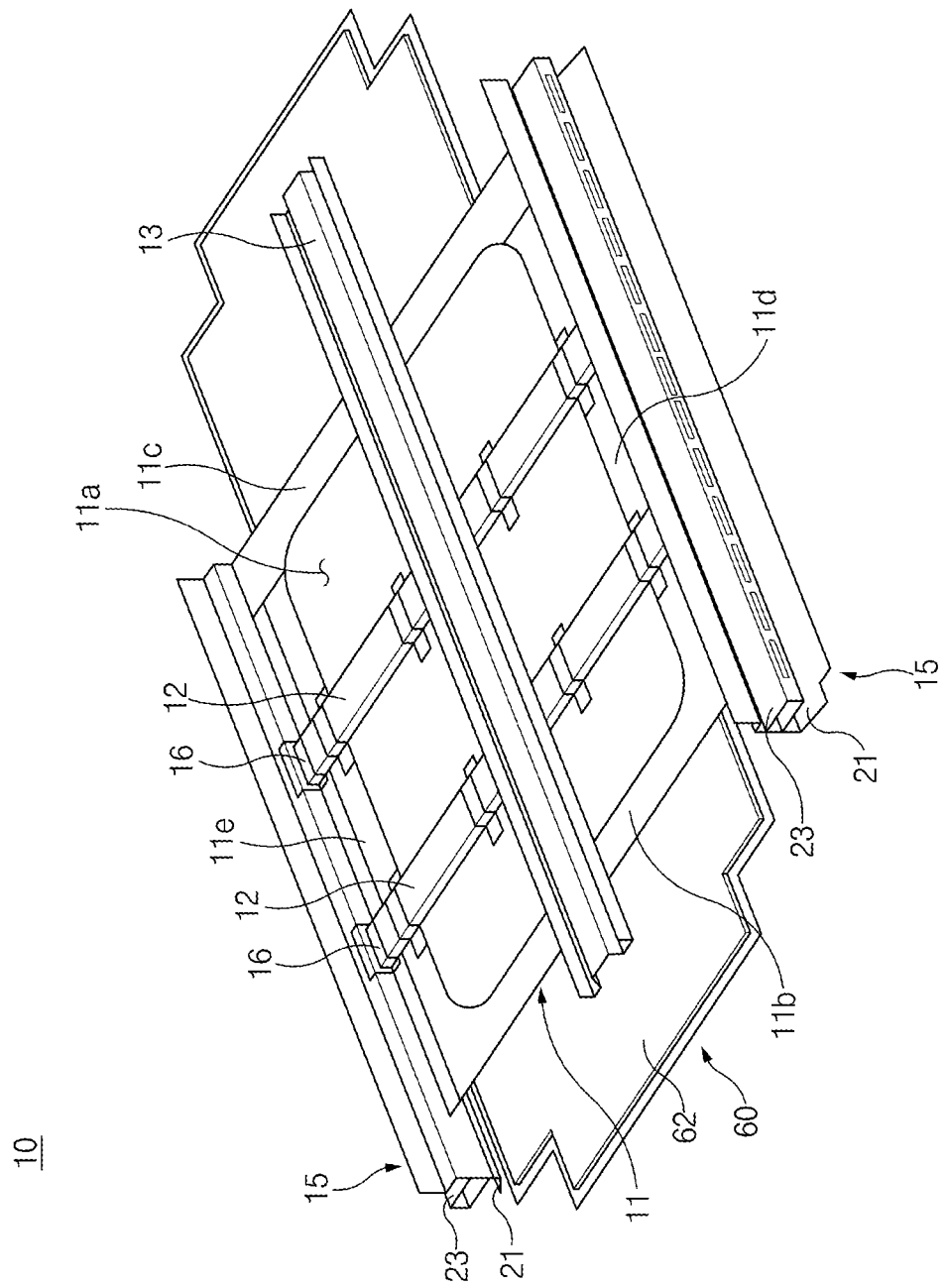
FIG. 1 illustrates a perspective view of a floor structure for a vehicle according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
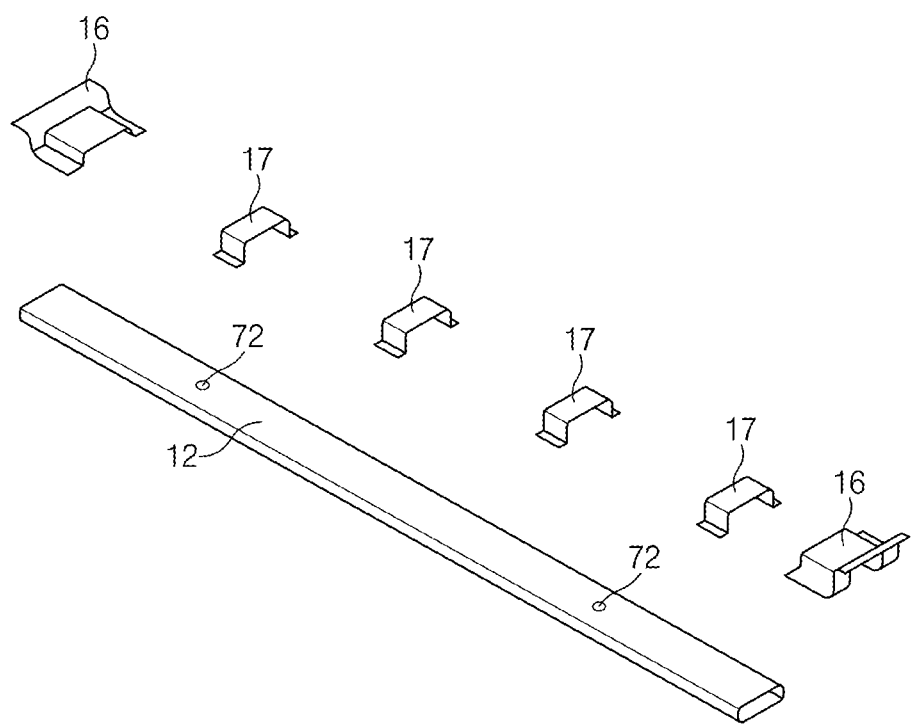
FIG. 2 illustrates an exploded perspective view of a seat crossmember and a mounting bracket in a floor structure for a vehicle according to an exemplary embodiment of the present disclosure.
Figure 3:
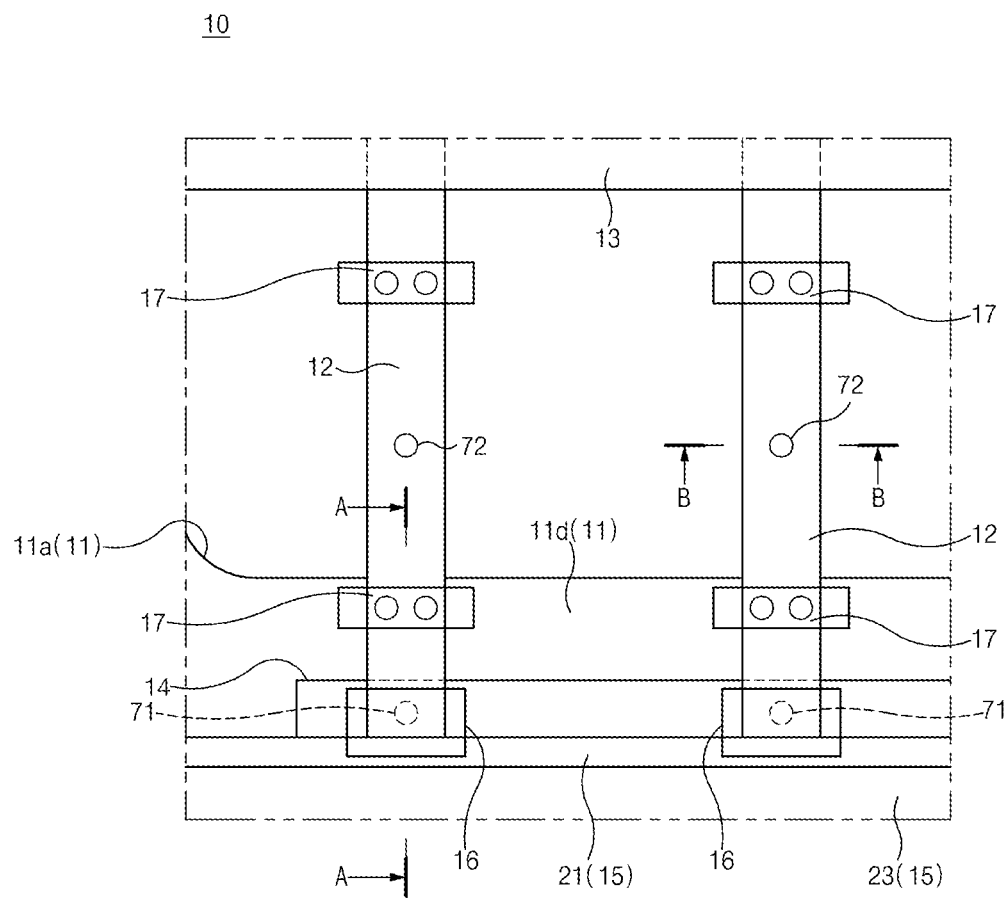
FIG. 3 illustrates a plan view of a portion of a floor structure for a vehicle according to an exemplary embodiment of the present disclosure.

Referring to FIGS. 1 and 2, a floor structure 10 for a vehicle according to an exemplary embodiment of the present disclosure may include a center floor panel 11 disposed in a lower portion of a vehicle body, a plurality of seat crossmembers 12 extending in a width direction of a vehicle, and a rail member 13 disposed to be orthogonal to the plurality of seat crossmembers 12.

As illustrated in FIGS. 1 and 2, the center floor panel 11 may be disposed in the lower portion of the vehicle body to form a floor of the vehicle, and the center floor panel 11 may have an opening 11a formed in the center thereof. The center floor panel 11 may have a front portion 11b facing the front of the vehicle, a rear portion 11c facing the rear of the vehicle, and a pair of side portions 11d and 11e facing both left and right sides of the vehicle.

Figure 4:
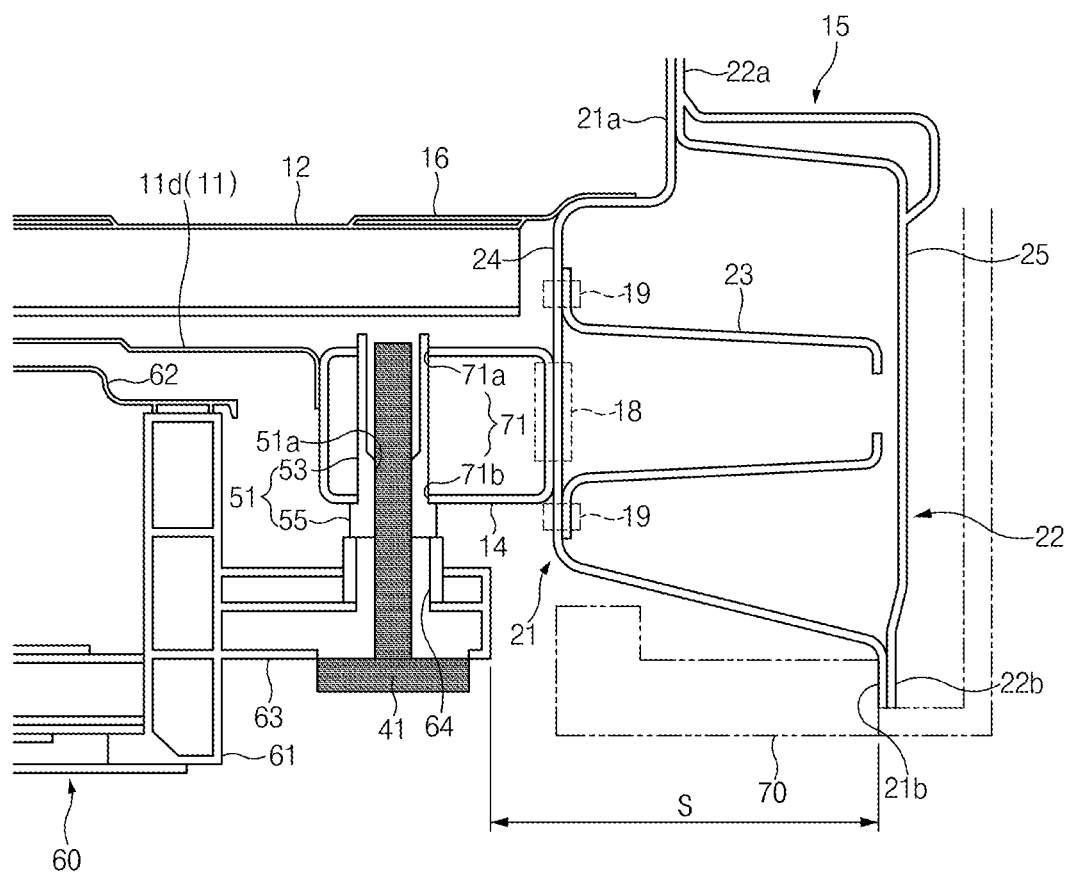
FIG. 4 illustrates a cross-sectional view taken along line A-A of FIG. 3.

As illustrated in FIGS. 1 and 4, a pair of side sills 15 may be connected to both left and right sides of the center floor panel 11, respectively. Each side sill 15 may include an inner side sill 21 and an outer side sill 22, and the inner side sill 21 and the outer side sill 22 may extend in a longitudinal direction of the vehicle. The inner side sill 21 may have an upper flange 21a and a lower flange 21b, and the outer side sill 22 may have an upper flange 22a and a lower flange 22b. The upper flange 21a of the inner side sill 21 and the upper flange 22a of the outer side sill 22 may be coupled by welding, using fasteners, and/or the like, and the lower flange 21b of the inner side sill 21 and the lower flange 22b of the outer side sill 22 may be coupled by welding, using fasteners, and/or the like. Each side sill 15 may have an inboard sidewall 24 facing the interior of the vehicle and an outboard sidewall 25 facing the outside of the vehicle. The inboard sidewall 24 may be a sidewall of the inner side sill 15, and the outboard sidewall 25 may be a sidewall of the outer side sill 15.

Each side sill 15 may include an inner reinforcing member 23 mounted therein, and the inner reinforcing member 23 may be an aluminum extruded product extending in the longitudinal direction of the vehicle. The inner reinforcing member 23 may be coupled to the inner side sill 21 by spot welding 19 and/or the like.

A pair of battery mounting beams 14 may be mounted on the pair of side sills 15, respectively. Each battery mounting beam 14 may extend in the longitudinal direction of the vehicle. The battery mounting beam 14 may be coupled to the inboard sidewall 24 of the side sill 15 by laser welding or laser screw welding (LSW) 18, and/or the like. The battery mounting beam 14 may have a tubular shape having a closed cross-section. For example, the battery mounting beam 14 may be a tube formed by roll forming and welding. As the battery mounting beam 14 is coupled to the inboard sidewall 24 of the side sill 15 by laser welding or laser screw welding (LSW), interference between components occurring during the assembly of a battery assembly may be prevented, so that the loading of the components may be carried out smoothly.

Figure 5:
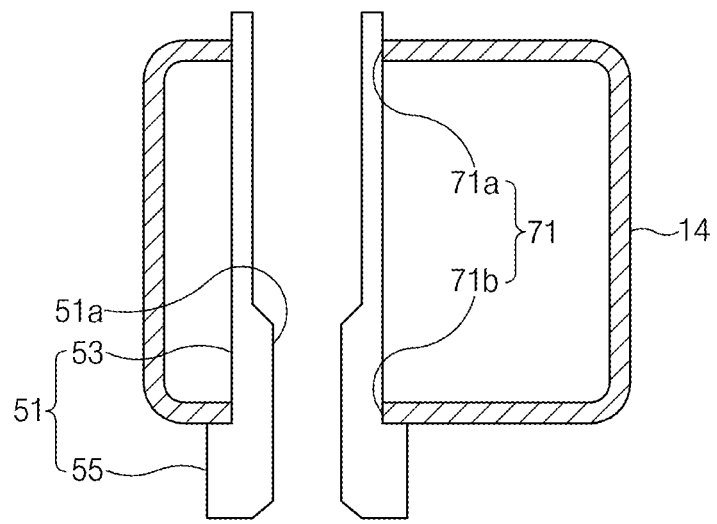
FIG. 5 illustrates a battery mounting beam and a first cylindrical nut in a floor structure for a vehicle according to an exemplary embodiment of the present disclosure.

Referring to FIGS. 1 and 4, the side portions 11d and 11e of the center floor panel 11 may be coupled to the battery mounting beams 14 by welding and/or the like, respectively. Referring to FIGS. 4 and 5, each battery mounting beam 14 may have a plurality of first through holes 71. The plurality of first through holes 71 may be spaced apart from each other in a longitudinal direction of the battery mounting beam 14 so that the plurality of first through holes 71 may be arranged in the longitudinal direction of the vehicle. A first cylindrical nut 51 for mounting a battery assembly 60 may be coupled to each first through hole 71 by welding and/or the like.

Each first through hole 71 may extend in a height direction of the vehicle. Each first through hole 71 may define a first upper opening 71a and a first lower opening 71b in the battery mounting beam 14. The first upper opening 71a may be formed in a top surface of the battery mounting beam 14, and the first lower opening 71b may be formed in a bottom surface of the battery mounting beam 14. The first cylindrical nut 51 may have a hollow cylindrical shape, and a first female thread (internal thread) 51a to which a first bolt 41 is screwed may be formed on the inside of the first cylindrical nut 51. The first cylindrical nut 51 may include a first cylindrical portion 53 passing through the first through hole 71 of the battery mounting beam 14, and a first head portion 55 formed on a bottom end of the first cylindrical portion 53. The first cylindrical portion 53 may extend in the height direction of the vehicle. A top end of the first cylindrical portion 53 may be coupled to the first upper opening 71a of the first through hole 71 by welding and/or the like, and the bottom end of the first cylindrical portion 53 may be coupled to the first lower opening 71b of the first through hole 71 by welding and/or the like. The first head portion 55 may be coupled to the bottom surface of the battery mounting beam 14 adjacent to the first lower opening 71b by welding and/or the like. As the first cylindrical nut 51 is coupled to the battery mounting beam 14, the battery mounting beam 14 may obtain enough stiffness in a portion thereof to which the first bolt 41 is fastened. Compared to the related art, stiffness may be secured and durability may be improved, which enables an increase in the weight of the battery assembly 60, contributing to an increase in the range of an electric vehicle.

The plurality of seat crossmembers 12 may be disposed on the center floor panel 11, and both ends of each seat crossmember 12 may be individually coupled to the pair of side sills 15. As illustrated in FIGS. 1 and 2, as both ends of each seat crossmember 12 are coupled to the pair of side sills 15 through end joints 16, respectively, each seat crossmember 12 may connect between the pair of side sills 15 in the width direction of the vehicle. The seat crossmember 12 may have a tubular shape having a closed cross-section, and a plurality of mounting brackets 17 may be coupled to an outer surface of the seat crossmember 12. A seat rail (not shown) of a vehicle seat may be mounted on the plurality of mounting brackets 17.

The rail member 13 may extend in the longitudinal direction of the vehicle, and the rail member 13 may be mounted across the plurality of seat crossmembers 12 along a center line of the vehicle body. A center console (not shown) may be mounted on the rail member 13. For example, in an electric vehicle, the center console may be mounted to move along the rail member 13 in the longitudinal direction of the vehicle.

The rail member 13 may extend in the longitudinal direction of the vehicle, and the seat crossmember 12 and the rail member 13 may be orthogonal to each other. For example, the rail member 13 may be coupled to the plurality of seat crossmembers 12 by laser screw welding (LSW) and/or the like. Alternatively, the plurality of seat crossmembers 12 may be configured to pass through the rail member 13.

The battery assembly 60 may be disposed under the center floor panel 11. The battery assembly 60 may include one or more battery cells (or a battery module), electrical components associated with the battery cells, a battery housing 61 in which the battery cells and the electrical components are mounted, and a cover covering the top of the battery housing 61.

The battery housing 61 may have a pair of side mountings 63 provided on both sides thereof, respectively, and each side mounting 63 may extend toward the adjacent side sill 15. Each side mounting 63 may have a through hole 64 through which the first bolt 41 passes. As the first bolt 41 passes through the through hole 64 of the side mounting 63 and is fastened to the first cylindrical nut 51 of the battery mounting beam 14, the side mounting 63 may be coupled to the battery mounting beam 14.

As the battery mounting beam 14 is coupled to the inboard sidewall 24 of the side sill 15, a space between the outboard sidewall 25 of the side sill 15 and the side mounting of the battery assembly 60 may be relatively increased compared to the related art, and thus, a hanger attachment 70 for loading the vehicle body during the assembly of the vehicle body may be prevented from interfering with the side mounting 63. For example, the space S between the lower flanges 21b and 22b of each side sill 15 and the side mounting 63 of the battery assembly 60 may be approximately 123 mm, which is increased by approximately 32 mm or more compared to the related art. As illustrated in FIG. 4, although the hanger attachment 70 is mounted on a bottom surface of the side sill 15, it may not interfere with the side mounting 63 of the battery assembly 60.

In addition, the space S between the outboard sidewall 25 of the side sill 15 and the side mounting 63 of the battery assembly 60 may be sufficiently secured, allowing enough space for impact absorption in a side collision, and preventing deformation of the high-voltage battery assembly in the side collision.

Figure 6:
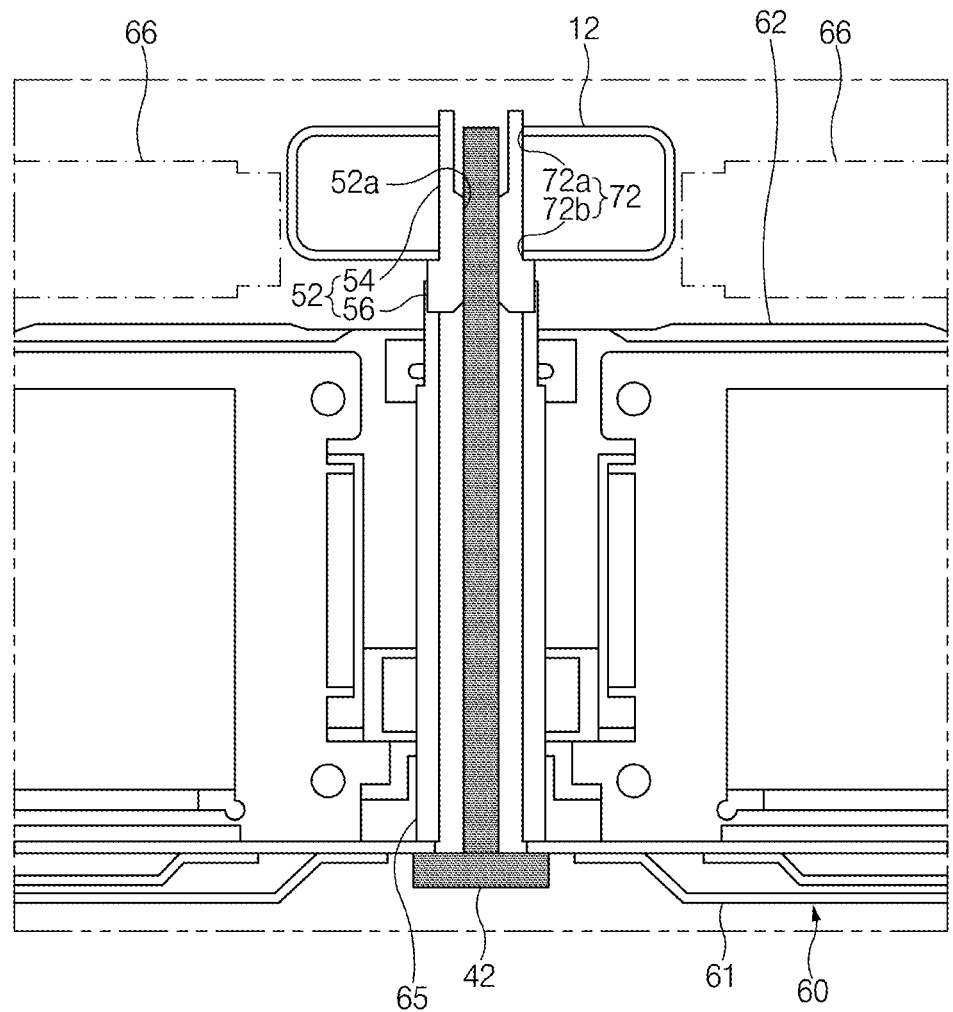
FIG. 6 illustrates a cross-sectional view taken along line B-B of FIG. 3.

Referring to FIG. 6, the seat crossmember 12 may have a plurality of second through holes 72. The plurality of second through holes 72 may be spaced apart from each other in a longitudinal direction of the seat crossmember 12 so that the plurality of second through holes 72 may be arranged in the width direction of the vehicle.

A second cylindrical nut 52 for mounting the battery assembly 60 may be coupled to each second through hole 72 by welding and/or the like. Each second through hole 72 may extend in the height direction of the vehicle. Each second through hole 72 may define a second upper opening 72a and a second lower opening 72b in the seat crossmember 12. The second upper opening 72a may be formed in a top surface of the seat crossmember 12, and the second lower opening 72b may be formed in a bottom surface of the seat crossmember 12. The second cylindrical nut 52 may have a hollow cylindrical shape, and a second female thread (internal thread) 52a to which a second bolt 42 is screwed may be formed on the inside of the second cylindrical nut 52. The second cylindrical nut 52 may include a second cylindrical portion 54 passing through the second through hole 72 of the seat crossmember 12, and a second head portion 56 formed on a bottom end of the second cylindrical portion 54. The second cylindrical portion 54 may extend in the height direction of the vehicle. A top end of the second cylindrical portion 54 may be coupled to the second upper opening 72a of the second through hole 72 by welding and/or the like, and a bottom end of the second cylindrical portion 54 may be coupled to the second lower opening 72b of the second through hole 72 by welding and/or the like. The second head portion 56 may be coupled to the bottom surface of the seat crossmember 12 adjacent to the second lower opening 72b of the second through hole 72 by welding and/or the like. As the second cylindrical nut 52 is coupled to the seat crossmember 12, the seat crossmember 12 may obtain enough stiffness in a portion thereof to which the second bolt 42 is fastened. Compared to the related art, stiffness may be secured and durability may be improved, which enables an increase in the weight of the battery assembly 60, contributing to an increase in the range of the electric vehicle.

The battery assembly 60 may have a plurality of sleeves 65 mounted therein. Each sleeve 65 may extend in a vertical direction, and the second bolt 42 may pass through each sleeve 65. As the second bolt 42 passes through the sleeve 65 of the battery assembly 60 and is fastened to the second female thread 52a of the second cylindrical nut 52 of the seat crossmember 12, the battery assembly 60 may be coupled to the seat crossmember 12.

The side mounting 63 of the battery assembly 60 may be coupled to the side sill 15 through the first bolt 41 and the first cylindrical nut 51, and the sleeve 65 of the battery assembly 60 may be coupled to the seat crossmember 12 through the second bolt 42 and the second cylindrical nut 52, so that the battery assembly 60 may be mounted to the battery mounting beam 14.

Referring to FIG. 6, a space among the seat crossmember 12, the rail member 13, and the side sill 15 may be filled with a plurality of fillers 66 so that a flat floor structure may be formed. The fillers 66 may be made of a material capable of improving impact performance and sound insulation performance, such as pads and honeycomb panels, and the fillers 66 may protect passengers and the battery safely.

As set forth above, according to exemplary embodiments of the present disclosure, as the battery mounting beam is coupled to the inboard sidewall of the inner side sill, a space between the side mounting of the battery assembly and the outboard sidewall of the side sill may be sufficiently secured, thereby preventing the bogie or hanger attachment for loading the vehicle body during the assembly of the vehicle body from interfering with the side mounting, and allowing enough space for impact absorption in a side collision to prevent deformation of the high-voltage battery assembly in the side collision.

According to exemplary embodiments of the present disclosure, the cylindrical nut (pipe nut) may be coupled to the tubular seat crossmember so that the stiffness of the seat crossmember may be increased, and the battery assembly may be firmly mounted to the seat crossmember through the cylindrical nut so that durability may be improved. In particular, the battery assembly may be firmly coupled to the seat crossmember, which enables an increase in the weight of the battery assembly, contributing to an increase in the range of an electric vehicle.

According to exemplary embodiments of the present disclosure, as the battery mounting beam is coupled to the inboard sidewall of the inner side sill by laser screw welding (LSW) or laser welding, interference between components occurring during the assembly of the battery assembly may be prevented, so that the loading of the components may be carried out smoothly.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A floor structure for a vehicle, the floor structure comprising:
   a center floor panel;
   a plurality of seat crossmembers extending in a width direction of a vehicle;
   a rail member disposed to be orthogonal to the plurality of seat crossmembers;
   a pair of side sills disposed on both sides of the center floor panel; and
   a pair of battery mounting beams coupled to the pair of side sills, respectively,
   wherein cylindrical nuts for mounting a battery assembly are individually disposed on the battery mounting beams and the seat crossmembers.

2. The floor structure according to claim 1, wherein each battery mounting beam is coupled to an inboard sidewall of each side sill.

3. The floor structure according to claim 1, wherein each battery mounting beam has a plurality of first through holes,
   a first cylindrical nut among the cylindrical nuts for mounting the battery assembly is coupled to each first through hole, and
   the first cylindrical nut has a first female thread to which a first bolt is screwed.

4. The floor structure according to claim 3, wherein the first through hole includes:
   a first upper opening in a top surface of the battery mounting beam; and
   a first lower opening in a bottom surface of the battery mounting beam.

5. The floor structure according to claim 4, wherein the first cylindrical nut includes:
   a first cylindrical portion passing through the first through hole; and
   a first head portion disposed on a bottom end of the first cylindrical portion.

6. The floor structure according to claim 5, wherein a top end of the first cylindrical portion is coupled to the first upper opening, and
   the bottom end of the first cylindrical portion is coupled to the first lower opening.

7. The floor structure according to claim 1, wherein each seat crossmember has a plurality of second through holes,
   a second cylindrical nut among the cylindrical nuts for mounting the battery assembly is coupled to each second through hole, and
   the second cylindrical nut has a second female thread to which a second bolt is screwed.

8. The floor structure according to claim 7, wherein the second through hole includes:
   a second upper opening in a top surface of the seat crossmember; and
   a second lower opening in a bottom surface of the seat crossmember.

9. The floor structure according to claim 8, wherein the second cylindrical nut includes a second cylindrical portion passing through the second through hole, and a second head portion disposed on a bottom end of the second cylindrical portion.

10. The floor structure according to claim 9, wherein a top end of the second cylindrical portion is coupled to the second upper opening, and
   the bottom end of the second cylindrical portion is coupled to the second lower opening.

* * * * *